(12) United States Patent
Li

(10) Patent No.: US 12,535,865 B2
(45) Date of Patent: Jan. 27, 2026

(54) 3D PRINTABLE LIGHT SHADE FOR MEDICAL DEVICES

(71) Applicant: Spencer Li, Southington, CT (US)

(72) Inventor: Spencer Li, Southington, CT (US)

( * ) Notice: Subject to any disclaimer, the term of this patent is extended or adjusted under 35 U.S.C. 154(b) by 1058 days.

(21) Appl. No.: 17/570,387

(22) Filed: Jan. 7, 2022

(65) Prior Publication Data
US 2023/0221777 A1    Jul. 13, 2023

(51) Int. Cl.
*G06F 1/18* (2006.01)

(52) U.S. Cl.
CPC .................................... *G06F 1/182* (2013.01)

(58) Field of Classification Search
CPC ...... F21V 1/00; F21V 1/04; F21V 1/14; B60J 1/2011; G06F 1/182; G06F 1/1603; G02B 5/22; A47B 95/02
See application file for complete search history.

(56) References Cited

U.S. PATENT DOCUMENTS

| | | | | |
|---|---|---|---|---|
| 275,326 | A * | 4/1883 | Blackham | A47B 95/02 16/420 |
| 4,403,712 | A * | 9/1983 | Wiesinger | E05D 1/02 220/838 |
| 10,963,010 | B1 * | 3/2021 | Griffin | G02B 27/0018 |
| 2014/0007381 | A1 * | 1/2014 | Huang | A47B 95/02 16/421 |

FOREIGN PATENT DOCUMENTS

DE          4226984 C1 *  8/1993  ............. G04G 9/00

* cited by examiner

*Primary Examiner* — Bhisma Mehta
*Assistant Examiner* — Anna E Goldberg-Richmeier
(74) *Attorney, Agent, or Firm* — Nathan Curtis

(57) ABSTRACT

A light shade is disclosed. The light shade includes a mount that attaches to a light-emitting device, such as a medical device. A shade panel in a closed position covers some or all of the light-emitting portions of the medical device. The shade panel is held in an open position to allow full interaction with the medical device by a hinge and one or more locks. A handle on the shade panel may be located in a dark environment via a pinhole. The components of light shade may be manufactured via a 3D printing process.

20 Claims, 7 Drawing Sheets

3D PRINTABLE LIGHT SHADE FOR MEDICAL DEVICES

BACKGROUND OF THE INVENTION

Modern medical devices used to monitor the vital statistics of a patient or provide treatment often have large LED or LCD displays used to display data or be used as a touch-surface for providing inputs. Often, due to the importance of the medical device, it must remain functional in a patient's room at night. The light generated from the displays on these devices can make it difficult for patients to sleep, particularly if the patient is suffering from other ailments that impact their ability to obtain restful sleep. It is often difficult to update or "patch" the software on these sorts of medical devices, and there may be dangers in attempting to do so. Therefore, physical light shades or diffusers may be preferable over software means for controlling the light emitted from the device. However, due to the variety of medical devices and their overall shape and the shape of their displays, a particular light shade or diffuser will only function for a subset of devices. Thus, there is a need for a customizable light shade for a light-generating medical device.

3D printing is used to build a real-life 3D object from a digital model file. 3D printing is a type of "additive manufacturing" wherein an object of virtually any shape may be created by building up the object in successive layers of material. Traditional manufacturing techniques, contrary to additive manufacturing, mostly rely on the removal of materials to form the final object, for instance by cutting or drilling. One of the key advantages of additive manufacturing is the ability to produce complex shapes, such as hollow parts or parts with concealed internal geometries, which could not otherwise be constructed with traditional manufacturing techniques.

3D printing has proven to be a useful technology in a variety of industries for rapid prototyping because an engineer can design and print their prototype quickly and iteratively without the need for outside vendors or manufacturers. Additionally, due to the rapid increase in affordability of desktop 3D printers, 3D printing has also facilitated "distributed manufacturing" because any individual with access to a particular digital model file can produce the desired object with relatively small start-up costs. Accordingly, known 3D printing methods may advantageously be employed to inexpensively manufacture customized components for niche or highly specific uses, where such components may be prohibitively expensive or impractical to obtain using conventional manufacturing techniques.

SUMMARY OF THE INVENTION

An object of the present invention is to allow light emitted from a medical device to be blocked or reduced so that it does not disrupt the sleep of a patient in a healthcare setting. Many types of medical devices used today in healthcare settings emit light from various sources such as screens, buttons, indicators, and the like, to provide information to the operators of those devices, such as healthcare providers. A problem arises when a patient's condition requires one or more overnight stays in a hospital while they also must have a light-emitting medical device in the room. The light emitted from the medical device can prevent the patient from sleeping, particularly if the patient is suffering from symptoms that themselves prevent or impede restful sleep. Generally, these medical devices require constant operation and thus may not be powered down or otherwise prevented from emitting light throughout the night.

One circumstance in which the present invention may be employed arises in emerging treatments for acute myeloblastic leukemia, which require that the patient spend extended amounts of time beside an external infusion pump, including during time the patient would normally be sleeping. An external infusion pump is a stationary medical device used to deliver fluids into a patient's body in a controlled manner, including subcutaneously, epidurally, via controlled pressure injecting, or via the patient's circulatory system. The delivered fluids may include intravascular drugs, fluids, whole blood, or blood products to patients.

Infusion pumps may be typically used to administer these treatment-critical fluids over a long or continuous period of time to a patient in a hospital setting. However, pump failures can have significant implications for patient safety. In particular, health care providers must be able to quickly detect and react to a potential pump failure. Impromptu solutions used in the past to reduce the light emitted from the pump (such as, covering the pump with a sheet or towel) have failed by either not reducing the amount of light emitted enough (e.g., a thin sheet may allow too much light to shine through or fall off during the night, disrupting sleep), or reducing the light emitted too much (e.g., a towel or multiple sheets may completely obscure the light-emitting aspects of the device, making it difficult to locate in the dark), and may even be dangerous in an emergency situation by becoming entangled with the wiring or infusion tubing of the pump. Software is also a potential solution to control the amount of light emitted from said infusion pump. However, is often difficult to update the software on these sorts of medical devices because they often lack the required ports to do so. Additionally, attempted software updates may compromise the functionality of the device and present additional possibilities of user error because a caretaker may not know how to interact with the software. Conversely, a small physical cover can easily be removed in the case of emergency. The present invention rectifies all of the above mentioned issues, allowing the amount of light emitted to be precisely controlled while also reducing the possibility that the solution will become a hindrance during an emergency situation.

The present invention allows the light emitted from a medical device, such as an infusion pump, to be partially or completely blocked from the view of the patient while simultaneously allowing healthcare providers to check that the medical device is still emitting light and otherwise functioning correctly, without interacting directly with the medical device itself. A shade panel of the disclosed light shade may be positioned via a hinge connected to a mount to completely or partially obscure a light-emitting screen of a medical device from the perspective of the patient. The shade panel may be positioned such that some light is emitted when viewed from the side or from above, such that healthcare providers may determine whether the medical device is functioning normally without removing the shade panel.

Additionally, the present invention includes a locking mechanism to retain the shade panel in an open position without the need to hold it in place. In various embodiments, this locking mechanism may include a friction grip, ball joint, bolt or clip, tie, or a magnetic hold as is most suitable for the relevant medical device. The present invention also includes a mount capable of securing the light shade to the medical device such that the panel shade may partially or completely obscure a light-emitting screen when in the closed position. The precise shape and size of the mount will vary based on the contours of the medical device.

In various embodiments, the present invention includes a handle mounted on the exterior surface of the shade panel. The handle includes an opening, such as a pinhole, extending through the handle and the shade panel itself, such that light from the medical device may always be admitted through that opening. Advantageously, the use of a handle with an opening allows healthcare providers to determine that the medical device is functioning normally, when viewed from the front, without removing the panel. In this way, embodiments of the present invention allow for healthcare providers to check the status of the medical device without removing the panel and disturbing the sleep of the patient. Additionally, the light emitted from the opening can function to guide healthcare workers to the location of the handle in an otherwise dark room, allowing full access to the screen of the medical device.

In various embodiments, the shade panel is made of a material or is coated or affixed with a material that may be written on with erasable or non-erasable writing instrument, in order to improve the mood of the patient or provide a means for medical staff for keeping notes.

In various embodiments, the light shade may include a reversibly connectable or non-reversibly connectable additional shelf unit, in order to allow the patient or medical staff additional shelf space.

Additionally, there is a difficulty in designing a universal device to limit the amount of light emitted due to the variety of medical devices and differences in their overall shape and the shape of their displays. It is advantageous, therefore, to utilize 3D printing technology to manufacture various physical light shades compatible with specific medical devices using the methods of distributed manufacturing.

BRIEF DESCRIPTION OF THE DRAWINGS

Detailed embodiments of the invention are discussed below with reference to the accompanying drawings.

DETAILED DESCRIPTION OF THE INVENTION

The following explains various embodiments of the inventive light shade with reference to the drawings.

Figure 1:
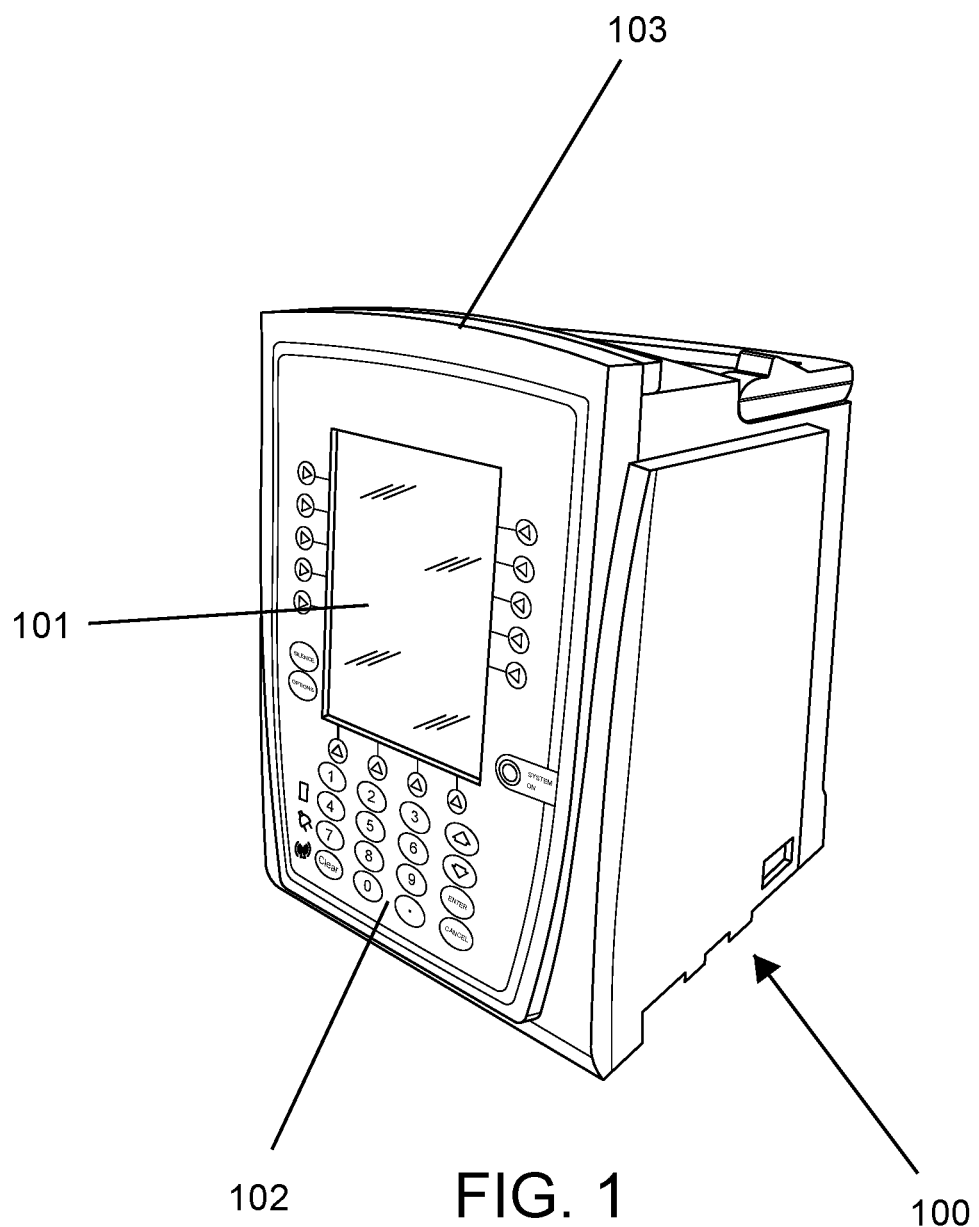
FIG. 1 is a representative drawing of a medical device with screen display used to monitors the vital statistics of a patient or provide treatment.

FIG. 1 depicts one type of medical device compatible with the present invention, although those of skill in the art will understand that the invention is compatible with any device that emits light from a display. In one embodiment, the device is an external infusion pump, although it will be understood by those of skill in the art that various other light-emitting devices, including both medical and other types of devices, are encompassed. External infusion pump 100 includes a screen 101 and a control panel 102 located on the exterior of a housing including an upper portion of the housing 103. Screen 101 may be any light-emitting electronic screen such as an LCD or LED display.

Typically, screen 101 displays information about the infusion pump and may also accept touch inputs for controlling the infusion pump. Control panel 102 may comprise an interface for healthcare personnel to interact with or operate the external infusion pump 100. Control panel 102 may also be emit light continuously or when interacted with by healthcare personnel, although typically substantially less light than screen 101. However, embodiments of the present invention include blocking light emitted from both screen 101 and control panel 102. The upper portion of the housing 103 may comprise an edge of the housing of the medical device extending upward from the exterior surface of the medical device that includes screen 101 and control panel 102.

Figure 2:
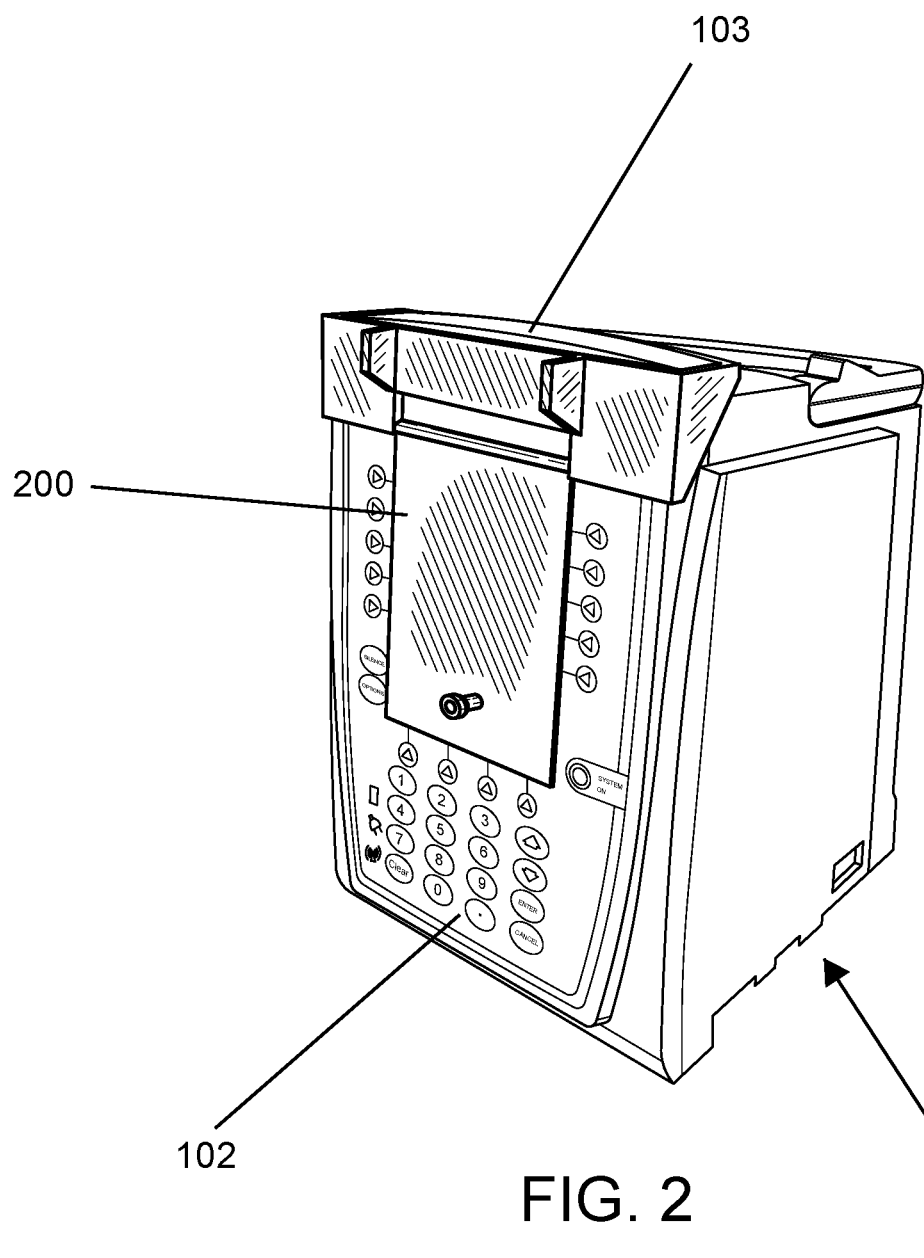
FIG. 2 illustrates a light shade in accordance with one embodiment of the invention in the close position mounted to the same representative medical device of FIG. 1.

FIG. 2 depicts an embodiment of the present invention light shade 200 in use in a closed position affixed to the same external infusion pump 100 shown in FIG. 1. Light shade 200 is mounted on upper portion of the housing 103 of external infusion pump 100. In the closed position, the shade panel of the light shade extends downward to partially or completely cover screen 101. In other embodiments, the shade panel also partially or completely covers control panel 102.

Figure 3:
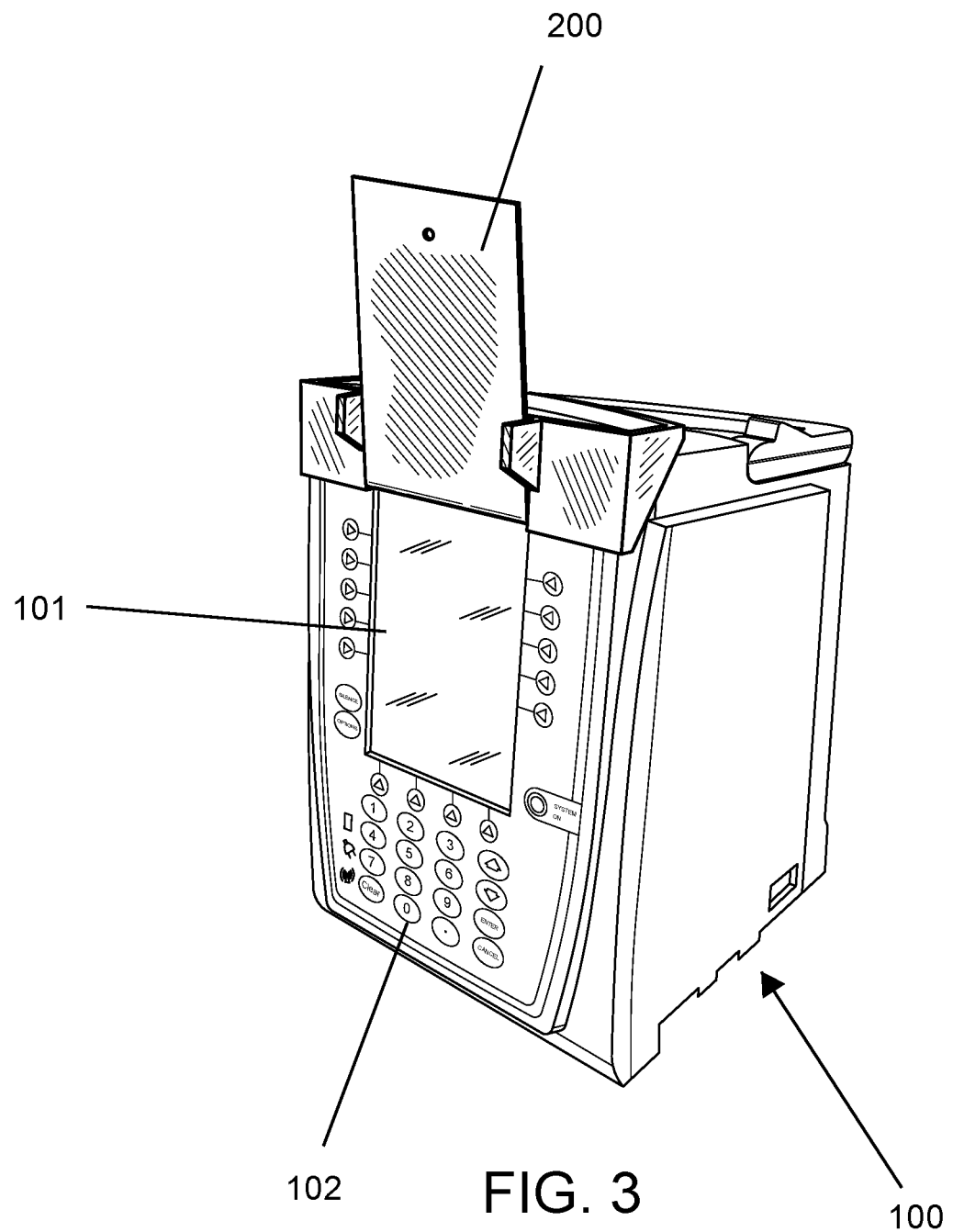
FIG. 3 illustrates a light shade in accordance with one embodiment of the invention in the open position mounted to the same representative medical device of FIG. 1.

FIG. 3 depicts the same use scenario described with respect to FIG. 2, except the light shade 200 is now is an open position. In the open position, screen 101 is not covered and emits light. The light shade 200 remains mounted to the upper portion of the housing 103 of external infusion pump 100. The mechanism by which the present invention transitions between the closed position depicted in FIG. 2 and the open position depicted in FIG. 3 is described with respect to FIGS. 4 through 11.

Figure 4:
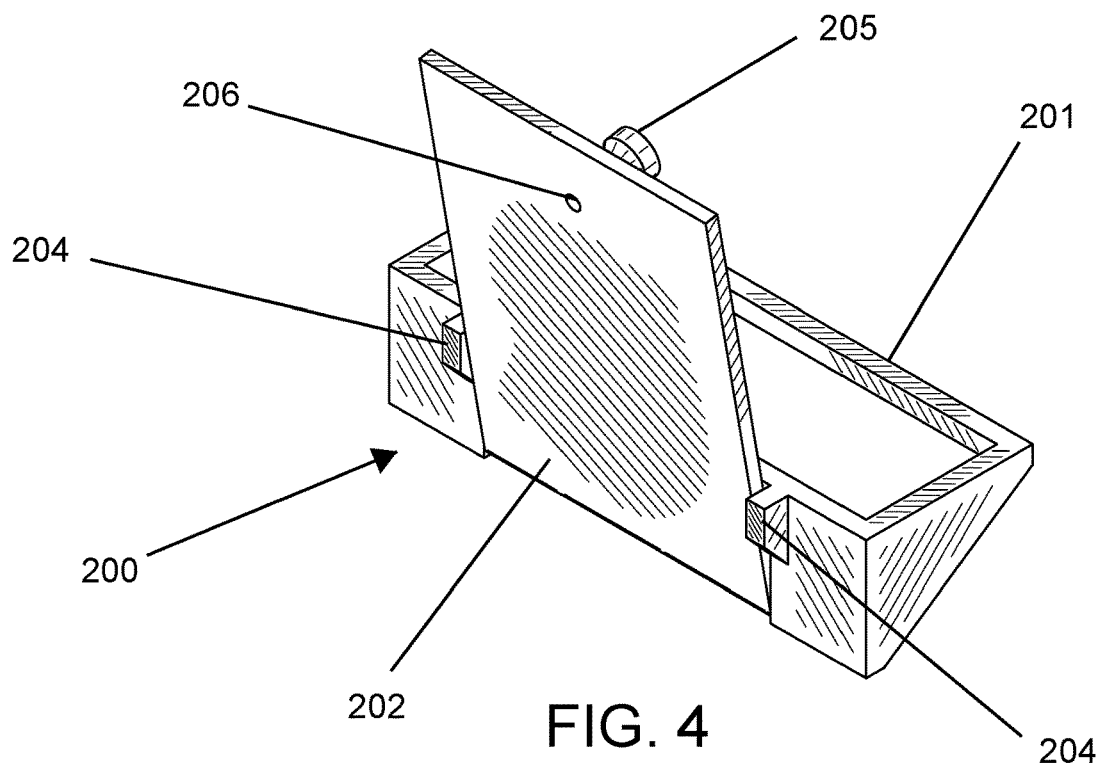
FIG. 4 illustrates a light shade in accordance with one embodiment of the invention in the open position.
Figure 5:
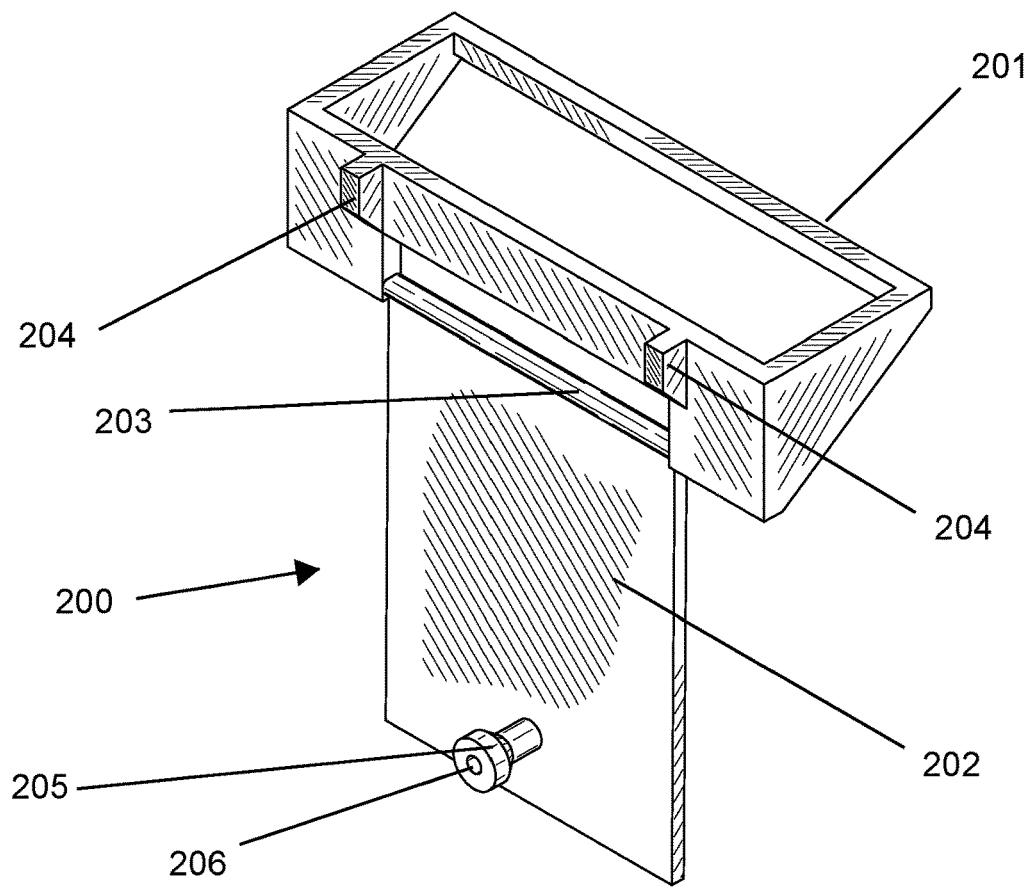
FIG. 5 illustrates a light shade in accordance with one embodiment of the invention in the closed position.

FIGS. 4 and 5 depict an embodiment of the present invention. Light shade 200 includes mount 201, shade panel 202, hinge 203, one or more locks 204, and handle 205 with pinhole 206. The components of light shade 200 are preferably composed of 3D printable material and manufactured via a 3D printing process. Preferably, mount 201 and shade panel 202 may be printed as separate components that are snap-fit together. FIGS. 6 through 11 depict additional views of the same embodiment of the present invention.

Mount 201 may be affixed to a portion of the exterior housing of a medical device, such as the upper portion of the housing 103 of external infusion pump 100 depicted in FIGS. 1-3. Mount 201 may be mounted to external infusion pump 100 through a variety of means, including via a friction grip between mount 201 of light shade 200 and the upper portion of housing 103, a lock-and-key grip, a tension grip, or with the aid of additional fasteners or adhesives. For example, the top surface of mount 201 depicted in FIGS. 4 and 5 is a hollow rectangular shape to allow mount 201 to be fastened around the extruding upper portion of the housing 103 of external infusion pump 100 and held in place by the friction between mount 201 and the extruding upper portion of the housing 103.

Those of skill in the art will appreciate that mount 201 may take a variety of forms depending on the size, shape, and contours of the particular medical device for use with the present invention, including the location of one or more light-emitting screens or control panels on those medical devices.

Shade panel 202 is connected to mount 201 via hinge 203. Hinge 203 permits shade panel 202 to rotate between the open position depicted in FIG. 4 and the closed position depicted in FIG. 5. In one embodiment, hinge 203 provides a rotatable coupling between shade panel 202 and mount 201. Hinge 203 may be any type of conventional hinge mechanism, including a snap-fit pivot hinge, a ball or cylinder hinge, a barrel hinge, a butt hinge, a spring hinge, and the like. When shade panel 202 is in the closed position, shade panel 202 extends downward from the exterior surface of mount 201 to at least partially cover a light-emitting screen of a medical device, such as screen 101 of external infusion pump 100.

Shade panel 202 may be comprised of an at least partially opaque material such that when shade panel 202 is in the closed position, shade panel 202 at least partially blocks light emitted from the screen of a medical device, such as screen 101 of external infusion pump 100. Additionally, in varying embodiments, shade panel 202 may be fully opaque. Alternatively, shade panel 202 may be construed to only allow light to pass through when viewed from certain angles, while at other angles the emission of light is partially or completely obscured.

In alternative embodiments, shade panel 202 may be comprised of a transparent or translucent material, to allow a diminished amount of light from screen 101 to emit from external infusion pump 100. Such designs would be advantageous in the context of a medical device that provides information on a light-emitting screen that needs to be viewed by healthcare providers from a distance. In further embodiments, shade panel 202, as well as optionally mount 201, may be made of a glow-in-the-dark material that emits less light than screen 101 to allow visualization of the complete light shade 200 while also reducing the total amount of light delivered into the room.

In various embodiments, the shade panel 202 is made of a material or is coated or affixed with a material that may be written on with erasable or non-erasable writing instrument, such as a dry-erase pen, a wet-erase pen, a piece of chalk, a permanent marker, etc. Shade panel 202 may be used in this way by a patient, such as a child patient, as a drawing surface, or may be drawn on by medical staff, to improve the mood of the patient. The shade panel 202 may also be used in this way by medical staff to write down reminders. By way of example, in various embodiments, shade panel 202 may include a chalkboard or whiteboard surface on which the patient may write or draw. In various other embodiments, shade panel 202 may include an adhesive or corkboard surface on which the patient may mount photographs or drawings. Embodiments of shade panel 202 or mount 201 may also include a reading light or a night light.

One or more locks 204 extrude from the exterior surface of mount 201 on either side of shade panel 202. The interior surface of the one or more locks 204 may contact the edges of shade panel 202 when shade panel 202 is in the open position depicted in FIG. 4. The interior surface of the one or more locks 204 includes a friction grip such that shade panel 202 is held in the open position when it makes contact with locks 204. The friction grip of locks 204 may comprise an adhesive material applied to the interior surface of locks 204 and/or the exterior edges of shade panel 202. However, those skilled in the art will appreciate that the locks 204 depict only one potential orientation of locking mechanisms compatible with the present invention. Other embodiments include, without limitation, orientation of a single locking mechanism on one or both sides of shade panel 202, underneath or above shade panel 202, and extruding from mount 201, flush with mount 201, or inside or sunken into mount 201. Those skilled in the art will further appreciate that a variety of locking mechanisms and other methods for retaining a hinged panel, such as shade panel 202, in position may be employed in place of locks 204 in the present invention, including but not limited to clips, hooks, bolts, fasteners, ball joints, magnets, or ties.

Handle 205 is attached to the exterior surface of shade panel 202. Pinhole 206 comprises an opening in the exterior surface of handle 205 that extends through to the interior surface of shade panel 202. Light may thus be emitted through pinhole 206 even when shade panel 202 is in the closed position, and users of the medical devices, including health care providers, may determine that the medical device is still operating normally without removing shade panel 202. Pinhole 206 may be substantially circular, polygonal, or any other conceivable shape to allow the passage of light without compromising the structural integrity of handle 205.

In various embodiments, light shade 200 may include a reversibly connectable or non-reversibly connectable additional shelf unit in order to allow the patient or medical staff additional shelf space. A shelf unit may affix to mount 201 and provide additional shelving space on the top or sides of external infusion pump 100. The shelf unit may affix to mount 201 with a snap-fit, a lock-in-key fit, or a variety of other reversible connection methods. The shelf unit may be suitable for storage of medical implements, toys, potted plants, and the like.

Figure 6:
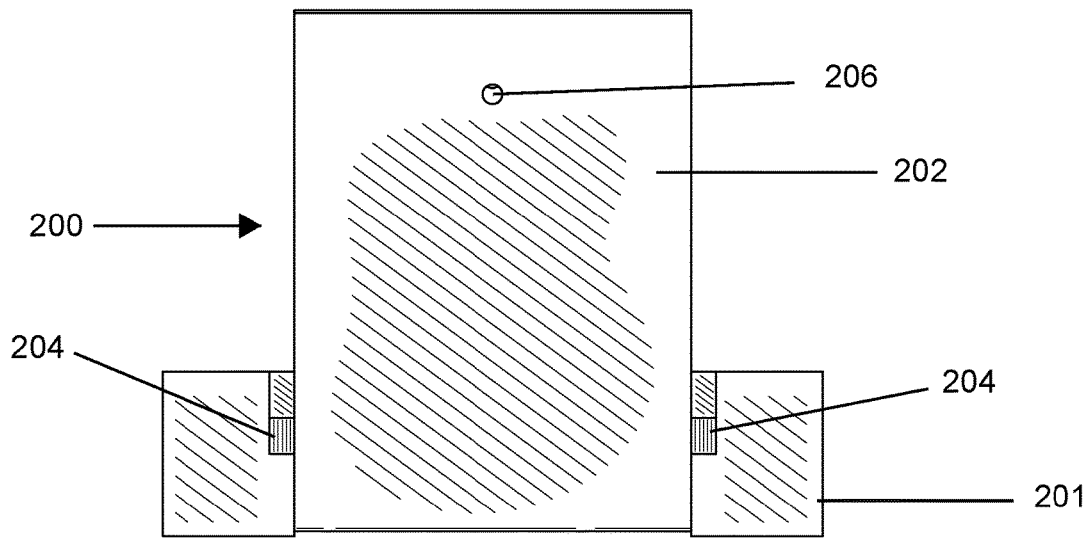
FIG. 6 illustrates a front perspective view of a light shade in accordance with one embodiment of the invention in the open position.
Figure 7:
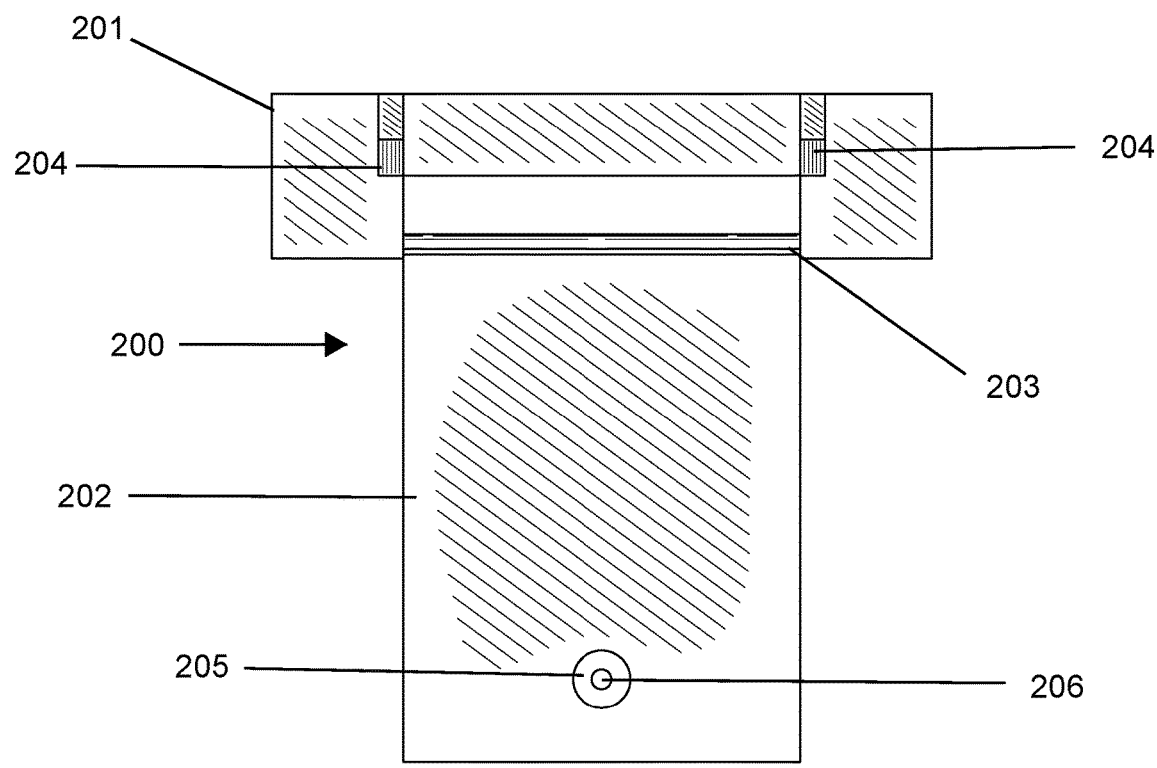
FIG. 7 illustrates a front perspective view of a light shade in accordance with one embodiment of the invention in the closed position.

FIGS. 6 and 7 depict a front perspective of a light shade in accordance with one embodiment of the invention, with FIG. 6 showing the light shade in an open position and FIG. 7 showing it in a closed position. The hinge 203 allows the shade panel 202 to rotate between the open position and the closed position. When the shade panel 202 is in contact with the friction grips of the lock(s) 204, the shade panel 202 remains in the open position as depicted in FIG. 6. When the shade panel 202 is not in contact with the friction grips of the lock(s) 204, the shade panel 202 remains in the closed position as depicted in FIG. 7.

Figure 8:
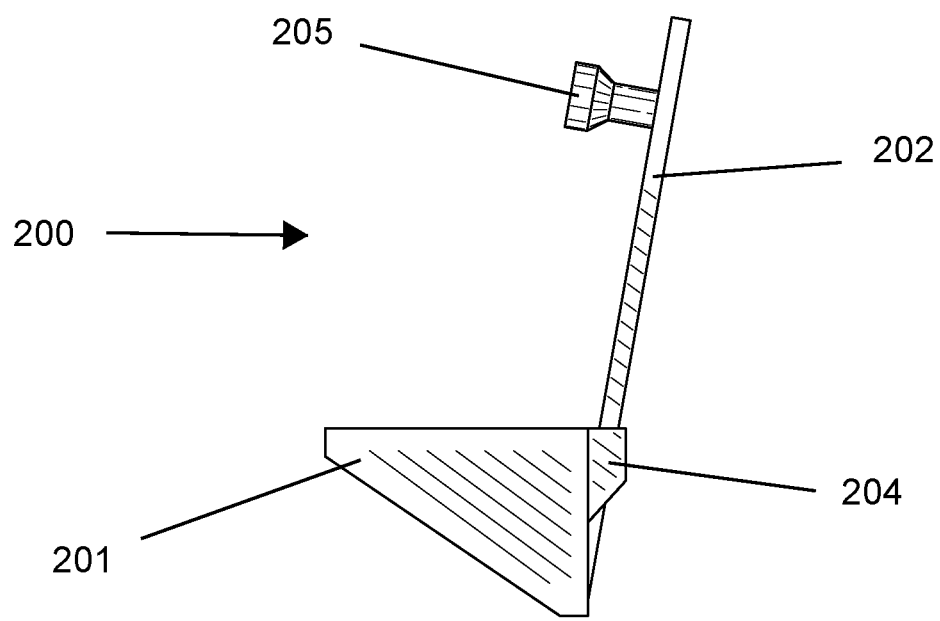
FIG. 8 illustrates a side perspective view of a light shade in accordance with one embodiment of the invention in the open position.
Figure 9:
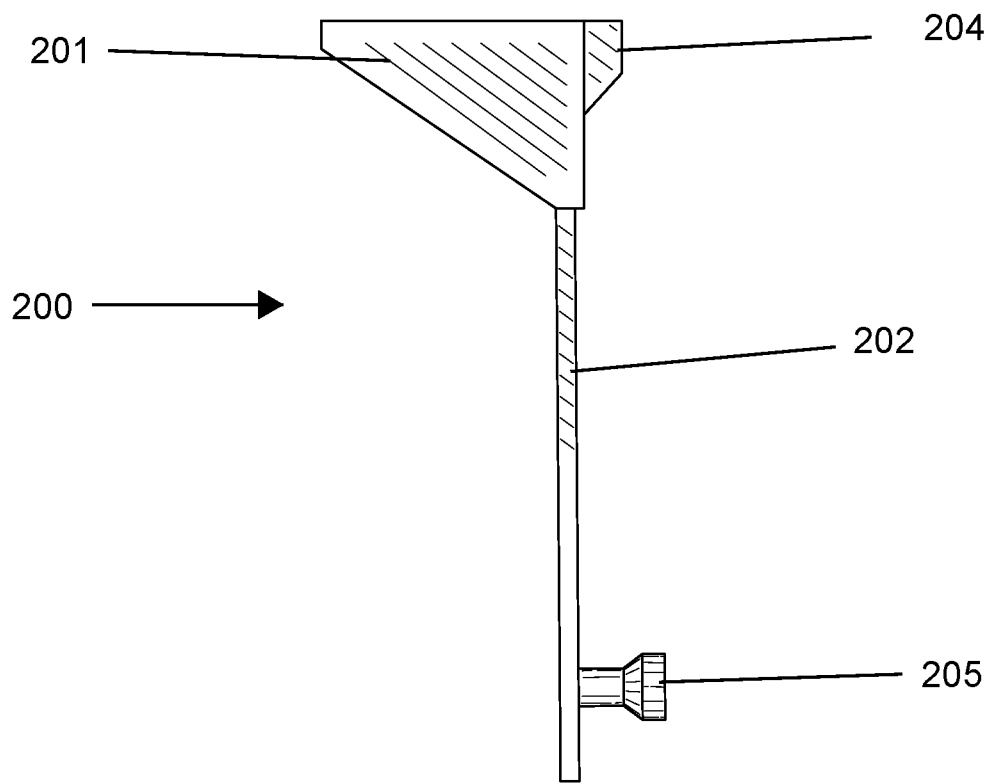
FIG. 9 illustrates a side perspective view of a light shade in accordance with one embodiment of the invention in the closed position.

FIGS. 8 and 9 depict a side perspective of a light shade in accordance with one embodiment of the invention, with FIG. 8 showing the light shade in an open position and FIG. 9 showing it in a closed position. FIGS. 8 and 9 demonstrate how the hinge 203 allows the shade panel 202 to rotate between the open position and the closed position.

Figure 10:
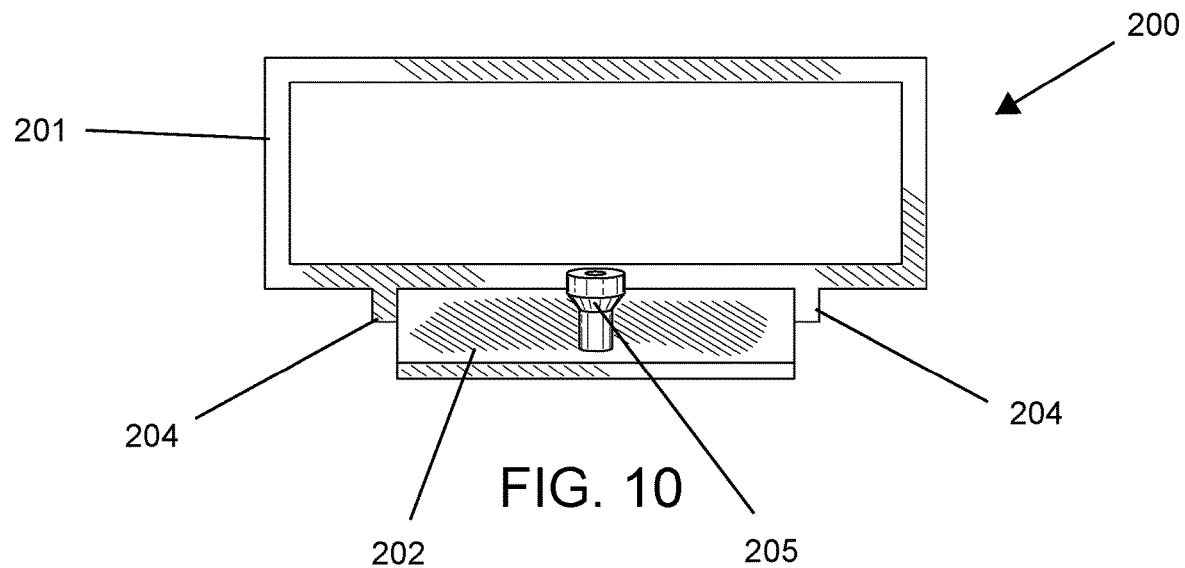
FIG. 10 illustrates a top perspective view of a light shade in accordance with one embodiment of the invention in the open position.
Figure 11:
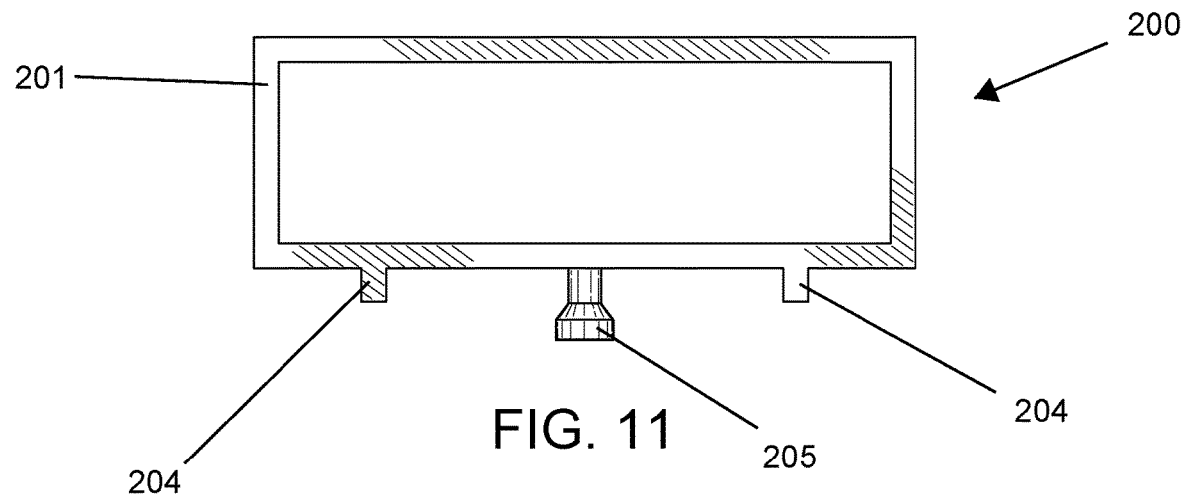
FIG. 11 illustrates a top perspective view of a light shade in accordance with one embodiment of the invention in the closed position.

FIGS. 10 and 11 depict a front perspective of a light shade in accordance with one embodiment of the invention, with FIG. 10 showing the light shade in an open position and FIG. 11 showing it in a closed position. When the edges of the lock(s) 204, which extend from the mount 201, make contact with the shade panel 202, the invention remains in the open position as depicted in FIG. 10. When the edges of the lock(s) 204, which extend from the mount 201, do not make contact with the shade panel 202, the invention remains in the open position as depicted in FIG. 11.

In one embodiment, the present invention may be manufactured to the precise size, shape, and contour for a given light-emitting medical device using a 3D printer; however, traditional manufacturing methods may also be employed. 3D printing is particularly well-suited to the present invention because it is inexpensive, widely available, and may be used to manufacture light shades suitable for compatibility with a wide variety of light-emitting medical devices. In this manner, an on-site technical support staff member will be able to download or create the necessarily files to print a light shade according to the present invention adapted for the particular kinds of medical devices in use in a particular setting.

One type of 3D printer particularly suited to the present invention is an extrusion-based or filament 3D printer, also known as a Fused Deposition Modeling, or "FDM" printer. These types of printers build up the 3D object layer-by-layer by extruding a flowable modeling material, usually a thermoplastic polymer, through an extrusion tip. This final product in this process is dictated by a digital model file that is first spliced into a series of horizontal layers with computer software.

Using the 3D printer, a filament of modeling material in solid form is fed through the extrusion tip in an extrusion head where it is heated to a viscous liquid form and deposited in a single layer by the extrusion tip. The extruded modeling material in liquid form fuses to the previous layer and re-solidifies as its temperature decreases. The printer will deposit material in a series of tracks in a single x-y plane to complete each layer, similar to how a normal printer deposits ink on a piece of paper. The extrusion head will then be raised incrementally along the z-axis and the process is repeated to create the next layer. The process is repeated until each layer of the digital model file has been reproduced and the entire digital model file has been rendered into a real-life 3D form made from the modeling material.

Depending on the type of 3D printer and the size and complexity of the model being printed, contemporary printers can print a model in a few hours. Depending on the type of printer used, additional finishing steps may be required, such as curing and cleaning.

Typical 3D printers utilized in the present invention employ a variety of thermoplastic polymers as a modeling material because such materials are inexpensive and their physical properties can be easily altered with the addition of heat or UV light. Common materials that may be used include polylactic acid (PLA), acrylonitrile, butadiene, styrene (ABS) polymer, and polyamides. However, other materials such as metals and ceramics may also be used in embodiments. Additionally, in some embodiments it may be beneficial to use transparent or opaque modeling material, such as polyamides (nylon), or even glow-in-the-dark modeling material to construct the light shades of the present invention.

The 3D digital model files utilized in the present invention can be created with a variety of computer-aided design ("CAD") or modelling software. A variety of software tools are available to create the CAD models, for instance SketchUp®, Autodesk Fusion 360®, Autodesk AutoCAD®, Solidworks®, and Blender® are examples of CAD or modelling software that are widely available. CAD models of the present invention may be saved as a stereolithography file format ("STL") or an Additive Manufacturing File format ("AMF").

Further processing may also be employed and can include error identification and repair to eliminate deficiencies in the CAD model that could lead to print failures, such as holes, self-intersections, and manifold errors. Additionally, the STL file used in the present invention may be processed with a "slicer" to convert the 3D digital model into a series of horizontal layers that may be printed by the printer. A G-code file containing instructions for the specific type 3D printer that will be used is generated. The G-code is read by the 3D printing client software and instructs the 3D printer how to construct the layers.

3D printing technology may therefore be advantageously used in the manufacture of the present invention to create highly-customizable light shades for use in with a large variety of light-emitting medical devices.

Due to the 3D printable nature of the present invention, many of the foregoing aspects of embodiments of the present invention are highly customizable. Primarily, the size, shape, and contours of both mount 201 and shade panel 202 may be altered such that the light shade may be securely mounted to a given medical device and the shade panel may partially or completely obscure one or more sources of light on the medical device. The locking mechanism employed may similarly be tailored to the requirements of a particular medical device. Additionally, the use of known 3D printing methods allow for the manufacture of the present invention in a wide variety of colors, patterns, or other textures.

Although the foregoing embodiment have been described in some detail for purposes of clarify of understanding, the invention is not limited to the details provided. There are many alternative ways of implementing the invention. The disclosed embodiments are illustrative and not restrictive. Various modifications from the embodiments disclosed herein may be made within the scope of the invention.

The invention claimed is:

1. A light shade, comprising:
    a mount; and
    a shade panel having an interior surface and an exterior surface opposite the interior surface;
    wherein the shade panel includes a hinge that is coupled to the mount, wherein the hinge allows the shade panel to rotate from a closed position to an open position;
    wherein either of the mount or the shade panel, or both, have a locking mechanism, wherein said locking mechanism forms a reversible connection between the shade panel and the mount and holds the shade panel in the open position;
    wherein the shade panel further includes a handle; and
    wherein the handle includes a pinhole that extends through the interior surface and the exterior surface and the pinhole is configured to allow light to pass through the pinhole when the shade panel is in the closed position.

2. The light shade of claim 1, wherein the mount attaches to a separate device.

3. The light shade of claim 2, wherein the separate device is a medical device.

4. The light shade of claim 2, wherein the mount attaches to the separate device via a friction grip.

5. The light shade of claim 1, wherein the locking mechanism utilizes a friction grip, ball joint, bolt or clip, tie, or a magnetic hold.

6. The light shade of claim 5, wherein the locking mechanism utilizes a friction grip.

7. The light shade of claim 1, wherein the hinge comprises a snap-fit pivot hinge or a ball or cylinder hinge.

8. The light shade of claim 1, wherein the pinhole is substantially circular.

9. The light shade of claim 1, wherein the exterior surface of the shade panel comprises a material that may be written on with a writing instrument from a group consisting of a dry erase pen, a wet erase pen, a piece of chalk, and a permanent marker.

10. The light shade of claim 1, wherein the mount has a shelf portion.

11. A light shade, comprising:
    a mount; and
    a shade panel having an interior surface and an exterior surface opposite the interior surface;
    wherein the shade panel is substantially flat;
    wherein the shade panel is rotatably coupled with the mount such that the shade panel is able to rotate from a closed position to an open position;
    wherein either of the mount or the shade panel, or both, have a locking mechanism, wherein said locking mechanism forms a reversible connection between the shade panel and the mount and holds the shade panel in the open position;
    wherein the shade panel further includes a handle; and
    wherein the handle includes a pinhole that extends through the interior surface and the exterior surface and the pinhole is configured to allow light to pass through the pinhole when the shade panel is in the closed position.

12. The light shade of claim 11, wherein the mount attaches to a separate device.

13. The light shade of claim 12, wherein the separate device is a medical device.

14. The light shade of claim 12, wherein the mount attaches to the separate device via a friction grip.

15. The light shade of claim 11, wherein the locking mechanism utilizes a friction grip, ball joint, bolt or clip, tie, or a magnetic hold.

16. The light shade of claim 15, wherein the locking mechanism utilizes a friction grip.

17. The light shade of claim 11, wherein the rotatable coupling between the mount and the shade panel comprises a snap-fit pivot hinge or a ball or cylinder hinge.

18. The light shade of claim 11, wherein the pinhole is substantially circular.

19. The light shade of claim 11, wherein the exterior surface of the shade panel comprises a material that may be written on with a writing instrument from a group consisting of a dry erase pen, a wet erase pen, a piece of chalk, and a permanent marker.

20. The light shade of claim 11, wherein the mount has a shelf portion.

\* \* \* \* \*